April 22, 1958     G. L. McMURRY     2,831,457
ANIMAL EXERCISING DEVICE
Filed July 17, 1956

Glen L. McMurry
INVENTOR.

BY

United States Patent Office 2,831,457
Patented Apr. 22, 1958

2,831,457

ANIMAL EXERCISING DEVICE

Glen L. McMurry, Holdenville, Okla.

Application July 17, 1956, Serial No. 598,408

2 Claims. (Cl. 119—29)

This invention relates in general to new and useful improvements in exercising devices, and more specifically to an improved exercising device intended primarily for exercising animals.

In many instances dogs are kept in pens where they do not have an opportunity to run freely. For example, hunting dogs are kept in pens most of the time and at the same time it is desired that on certain days that they be able to operate at their maximum efficiency. Because of lack of exercise, this is not possible. It is therefore one of the primary objects of this invention to provide an improved animal exercising device which is so constructed whereby the controlled exercising of a dog may be accomplished in a minimum of space.

Still another object of this invention is to provide an improved device for training dogs while exercising them, the device being so constructed whereby a dog is forced to move in a predetermined speed and at the same time is so retained whereby he must follow a preselected course.

Another object of this invention is to provide an improved animal exercising device which includes a shaft mounted for rotation and having carried thereby an arm, the arm being provided with suitable leash attaching means and being provided with an animal retarding seal so that the animal is forced to follow in a predetermined path at a predetermined speed, the shaft and arm being rotated by drive means which are of sufficient strength to pull the dog if the dog fails to respond.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
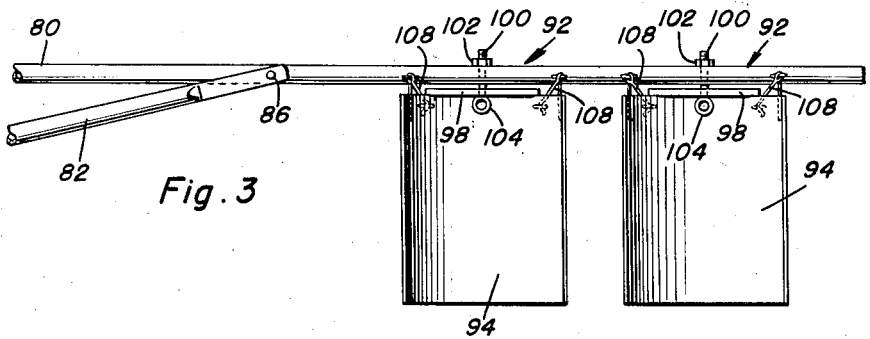
Figure 4:
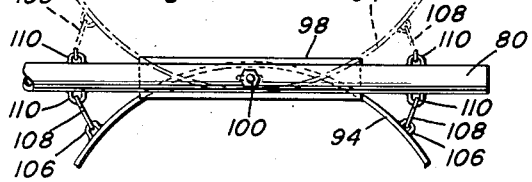

Figure 3 is an enlarged fragmentary elevational view of the outer part of the arm and shows the manner in which the animal retarding shields and a leash attaching means are carried thereby; and Figure 4 is an enlarged fragmentary plan view of the outer part of the arm and shows the specific details of the shield and the manner in which it is attached to the arm for selective position, an alternate position of the shield being shown by dotted line.

Referring now to the drawings in detail, it will be seen that there is illustrated the animal exercising device which is the subject of this invention, the animal exercising device being referred to in general by the reference numeral 10. The animal exercising device 10 includes a support plate 12 which is intended to be mounted on the ground 14 and which is secured in place by suitable fasteners 16. Extending upwardly from the central part of the support plate 12 is a supporting shaft assembly 18 which includes a base 20 suitably secured to the support plate 12 by means of fasteners 22. Extending upwardly from the base 20 is a shaft 24 which forms at its inner section with the base 20 a shoulder 26.

Rotatably journalled on the shaft 24 and extending upwardly thereabove is a tubular shaft 28. The tubular shaft 28 is provided at its lower end with a hub 30 which seats on a thrust bearing 32, the thrust bearing 32 being in turn seated on the shoulder 26. It is to be understood that the tubular shaft 28 is supported by the support shaft assembly 18 for rotation.

Carried by the support plate 12 in surrounding relation with respect to the supporting shaft assembly 18 is a housing which is referred to in general by the reference numeral 34. The housing 34 includes side walls 36 and an end wall 38 which have mounting flanges 40 secured to the support plate 12 by fasteners 42. The housing 34 also includes a top wall 44 which has hingedly connected thereto as at 46 an access plate 48 which functions as a second end wall of the housing 34. The access plate 48 is retained in a closed position by a fastener 50 which extends into an angle member 52 carried by the support plate 12.

Carried by the end wall 38 is an electric motor 54. The electric motor 54 includes an armature shaft 56 having mounted thereon a drive pulley 58.

Carried by the support plate 12 adjacent the access plate 48 is an upright bearing block 60 in which there is rotatably journalled a vertical shaft 62. Carried by the shaft 62 intermediate the ends thereof is a pulley 64 aligned with the pulley 58. The pulleys 58 and 64 are connected together by a drive belt 66 to facilitate the driving of the shaft 62.

Carried by the tubular shaft 28 within the housing 34 is an enlarged gear 68, the gear 68 being secured to the tubular shaft 28 by means of a setscrew 70. Carried by the upper end of the shaft 62 is a gear 72. The gear 72 is meshed with the gear 68 for rotating the tubular shaft 28 at the desired speed.

Carried by the upper part of the tubular shaft 28 is a pair of attaching ears 74. A similar pair of attaching ears 76 is carried by an intermediate portion of the tubular shaft 28 above the housing 34. Disposed between the attaching ears 74 and pivotally connected thereto by means of a pivot pin 78 is an outwardly extending arm 80 which is horizontally disposed. The arm 80 is braced by means of a brace 82 whose inner end is pivotally connected to the attaching ears 76 by means of a pivot pin 84. The outer end of the brace 82 is secured to an outer portion of the arm 80 by means of a fastener 86.

Carried by the shaft 28 in diametrically opposite relation with respect to the attaching ears 74 is a second pair of upper attaching ears 88. Similar attaching ears 90 are carried by the intermediate portion of the tubular shaft 28 in diametrically opposite relation with respect to the attaching ears 76. The attaching ears 88 and 90 may be utilized for mounting a second arm and a second brace if so desired. Additional attaching ears may be carried by the tubular shaft 28 to facilitate the mounting of additional arms and braces.

Carried by the outer end of the arm 80 is a pair of animal attaching and retarding assemblies which are referred to in general by the reference numeral 92. Inasmuch as the animal attaching and retarding assemblies 92 are identical, only one will be described in detail.

Figure 1:
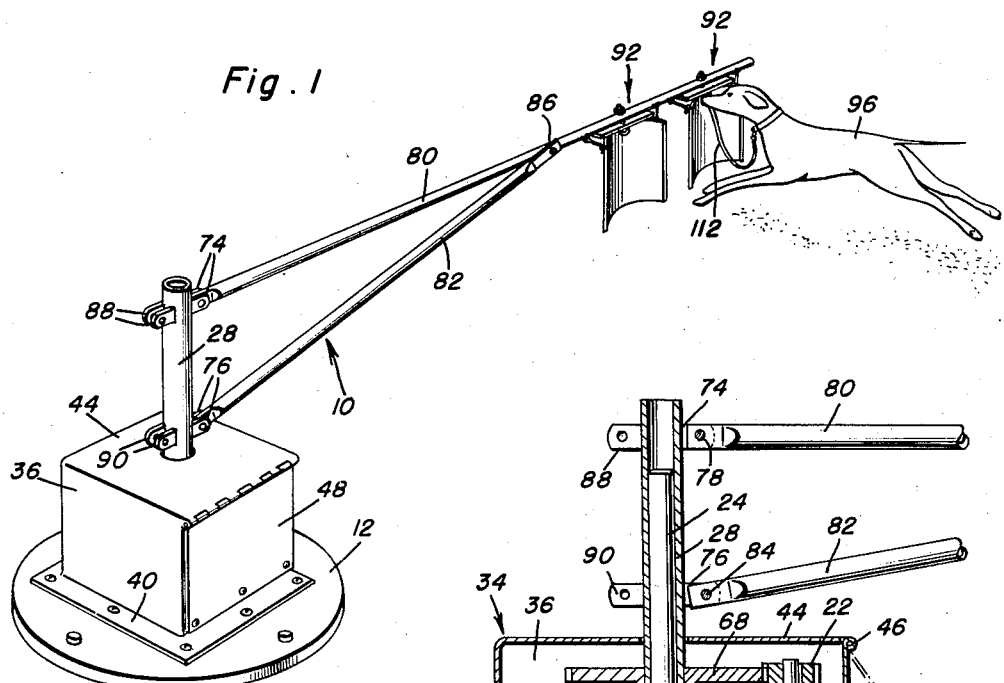
Figure 1 is a perspective view of the animal exercising device which is the subject of this invention and shows the same in operation for exercising a dog.
Figure 2:
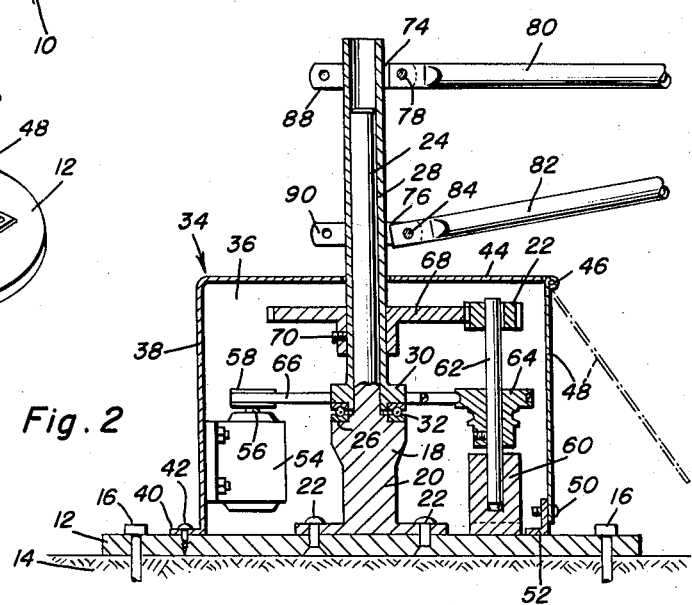
Figure 2 is an enlarged fragmentary vertical sectional view taken through the central part of the animal exercising device and shows the specific details and drive means thereof, an excess door being shown in a partially opened position by broken line.

Each of the animal attaching and retarding assemblies 92 includes an animal retarding shield 94 which depends from the arm 80 and is disposed therebeneath. As is best illustrated in Figure 4, the animal retarding shield 94 is arcuate in cross section so that it may provide a suitable shield for the animal, such as the dog 96 of Figure 1, to run behind. In order that the animal retarding shield 94 may be secured in place, secured to the upper edge thereof is a mounting plate 98. The mounting plate 98 has extending upwardly therethrough a fastener 100 which extends through the eye 80 and is retained in place by a nut 102. The fastener 100 includes an eye 104 which is disposed below the plate 98 and prevents the downward movement of the plate 98. It will thus be seen that the fastener 100 pivotally mounts the animal retarding shield 94 on the arm 80.

As is best illustrated in Figure 4, the animal retarding shield 94 may be positioned selectively depending upon the direction of rotation of the arm 80. In the solid line position the animal retarding shield 94 is mounted for movement of the arm 80 in a counterclockwise direction.

In order that the animal retarding shield 94 may be retained in a selected position, there is secured to the upper part of the animal retarding shield 94 adjacent the upper edges thereof eyes 106 which pivotally carry hooks 108. Secured to opposite sides of the arm 80 are eyes 110 for selectively receiving the hooks 108 to retain the animal retarding shield 94 in a selected position.

The purpose of the eye 104 of the fastener 100 is to receive one end of the leash, such as the leash 112 connected to the dog 96. Thus as the arm 80 rotates, in the event the dog 96 does not feel like running at first, the arm 80 will pull the dog through the leash 112. The purpose of the animal retarding shield 94 is to make the dog run in a predetermined path and to prevent the dog from running around the arm 80. It is to be understood that the leash 112 is such so as to make the dog 96 follow behind the animal retarding shield 94.

It is to be understood that the electric motor 54 will be of a sufficient strength to pull the desired number of dogs during the exercising thereof. Also, in order that the dog 96 will not learn to run in one direction only, the electric motor 54 is reversible so that the dogs may be exercised in any particular direction desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal exercising device comprising an upright shaft, means mounting said shaft for rotation, drive means connected to said shaft for rotating said shaft, an arm extending outwardly from said shaft for rotation therewith, leash attaching means carried by outer portions of said arm, an animal retarding shield carried by said arm in alignment with said leash attaching means, said leash attaching means being in the form of a fastener having an eye for receiving an end of a leash, said fastener mounting said animal retarding shield on said arm, said animal retarding shield being arcuate in cross section, said animal retarding shield being pivotally mounted on said fastener for reversal of position, means extending between said animal retarding shield and said arm retaining said animal retarding shield in a selected position.

2. An animal exercising device comprising an upright shaft, means mounting said shaft for rotation, drive means connected to said shaft for rotating said shaft, an arm extending outwardly from said shaft for rotation therewith, leash attaching means carried by outer portions of said arm, an animal retarding shield carried by said arm in alignment with said leash attaching means, said leash attachment means being in the form of a fastener having an eye for receiving an end of a leash, said fastener mounting said animal retarding shield on said arm, said animal retarding shield being arcuate in cross section, said animal retarding shield being pivotally mounted on said fastener for reversal of position, means extending between said animal retarding shield and said arm retaining said animal retarding shield in a selected position, said drive means being of the reversible type.

References Cited in the file of this patent

UNITED STATES PATENTS

| | | |
|---|---|---|
| 825,970 | Hoover | July 17, 1906 |
| 1,956,937 | Van Kleek | May 1, 1934 |
| 2,489,438 | Schrader | Nov. 29, 1949 |
| 2,510,828 | Mills | June 6, 1950 |